US008341630B2

(12) United States Patent
Grouzdev

(10) Patent No.: US 8,341,630 B2
(45) Date of Patent: Dec. 25, 2012

(54) LOAD BALANCING IN A DATA PROCESSING SYSTEM HAVING PHYSICAL AND VIRTUAL CPUS

(75) Inventor: Vladimir Grouzdev, Paris (FR)

(73) Assignee: Virtuallogix SA, Montigny-le-Bretonneux (FR)

( * ) Notice: Subject to any disclaimer, the term of this patent is extended or adjusted under 35 U.S.C. 154(b) by 897 days.

(21) Appl. No.: 12/142,379

(22) Filed: Jun. 19, 2008

(65) Prior Publication Data

US 2008/0320489 A1    Dec. 25, 2008

(30) Foreign Application Priority Data

Jun. 19, 2007 (EP) .................................. 07290793

(51) Int. Cl.
*G06F 9/00* (2006.01)

(52) U.S. Cl. ........................................................ 718/100

(58) Field of Classification Search .................. None
See application file for complete search history.

(56) References Cited

U.S. PATENT DOCUMENTS

| | | | | |
|---|---|---|---|---|
| 6,298,370 B1 * | 10/2001 | Tang et al. | ..................... | 718/102 |
| 6,370,560 B1 | 4/2002 | Robertazzi et al. | | |
| 7,028,302 B2 * | 4/2006 | Kiick | ............................ | 718/105 |
| 2005/0055694 A1 * | 3/2005 | Lee | ................................ | 718/100 |

OTHER PUBLICATIONS

Extended European Search Report completed Nov. 13, 2007 and Communication of Feb. 13, 2008 in EP 07 29 0793.
Jacob J. C., et al., "A spanning tree based recursive refinement algorithm for fast task mapping," Proceedings of the Fourth IEEE International Symposium on High Performance Distributed Computing (Cat. No. 95TB8075) IEEE Comput. Soc. Press, Los Alamitos, CA, 1995, pp. 58-65, XP002458251, ISBN: 0-8186-7088-6.
E. Piel, P. Marquet, J. Soula, and J. -L. Dekeyser: "Load-Balancing for a Real-Time System Based on Asymmetric Multi-Processing," 16th Euromicro Conference on Real-Time Systems, WIP Session, Jun. 2004, XP002458252, Catania, Italy.

* cited by examiner

*Primary Examiner* — Robert Fennema

(74) *Attorney, Agent, or Firm* — Nixon & Vanderhye PC

(57) ABSTRACT

In a preferred embodiment, the present invention provides a method of load balancing in a data processing system comprising a plurality of physical CPUs and a plurality of virtual CPUs, the method comprising: mapping one or more virtual CPUs to each of said physical CPUs; and dynamically adapting the mapping depending on the load of said physical CPUs and the negative load indicative of the load of all other virtual CPUs that are allocated to each physical CPU.

11 Claims, 7 Drawing Sheets

LOAD BALANCING IN A DATA PROCESSING SYSTEM HAVING PHYSICAL AND VIRTUAL CPUS

BACKGROUND

A virtual machine is a self-contained execution environment that behaves as if it is a separate computer and which can run its own operating system. Virtual machines provide Virtual CPUs (VCPUs) to clients or "guests", and each VCPU runs on a dedicated physical CPU. A VCPU is a representation of a physical processor within a Virtual Machine. In conventional systems, the mapping between virtual and physical CPUs is static.

If multiple CPUs are available to a client or "guest", the guest tasks are spread between the CPUs. This is preferably done such that the available resources are used in the most efficient way and computing time is decreased. This process is generally referred to as "load balancing".

Conventional load balancing algorithms may be insufficient. Let us consider, for example, the sharing of a plurality of physical CPUs between dedicated real-time software and generic server software. Let us assume an UP (uniprocessor) execution environment (e.g. LINUX) running the real-time software on CPU 0, and an SMP (symmetric multiprocessing) execution environment (LINUX) running a server software on CPUs 0-3. In this example, CPU 0 is shared between the real-time software and the server software. The dedicated real-time has a higher scheduling priority. In this example, the SMP load balancer does not take into account the real-time activity on CPU 0. This may skew the SMP load balancing.

The present invention aims to address this and other problems of conventional load balancing. In particular, but not exclusively, the present invention is concerned with better balancing the load of physical CPUs in a computer system comprising physical and virtual CPUs.

SUMMARY OF THE INVENTION

The invention is recited by the independent claims. Preferred features are recited by the dependent claims.

DESCRIPTION OF EXEMPLARY EMBODIMENTS OF THE INVENTION

Introduction

Figure 1:
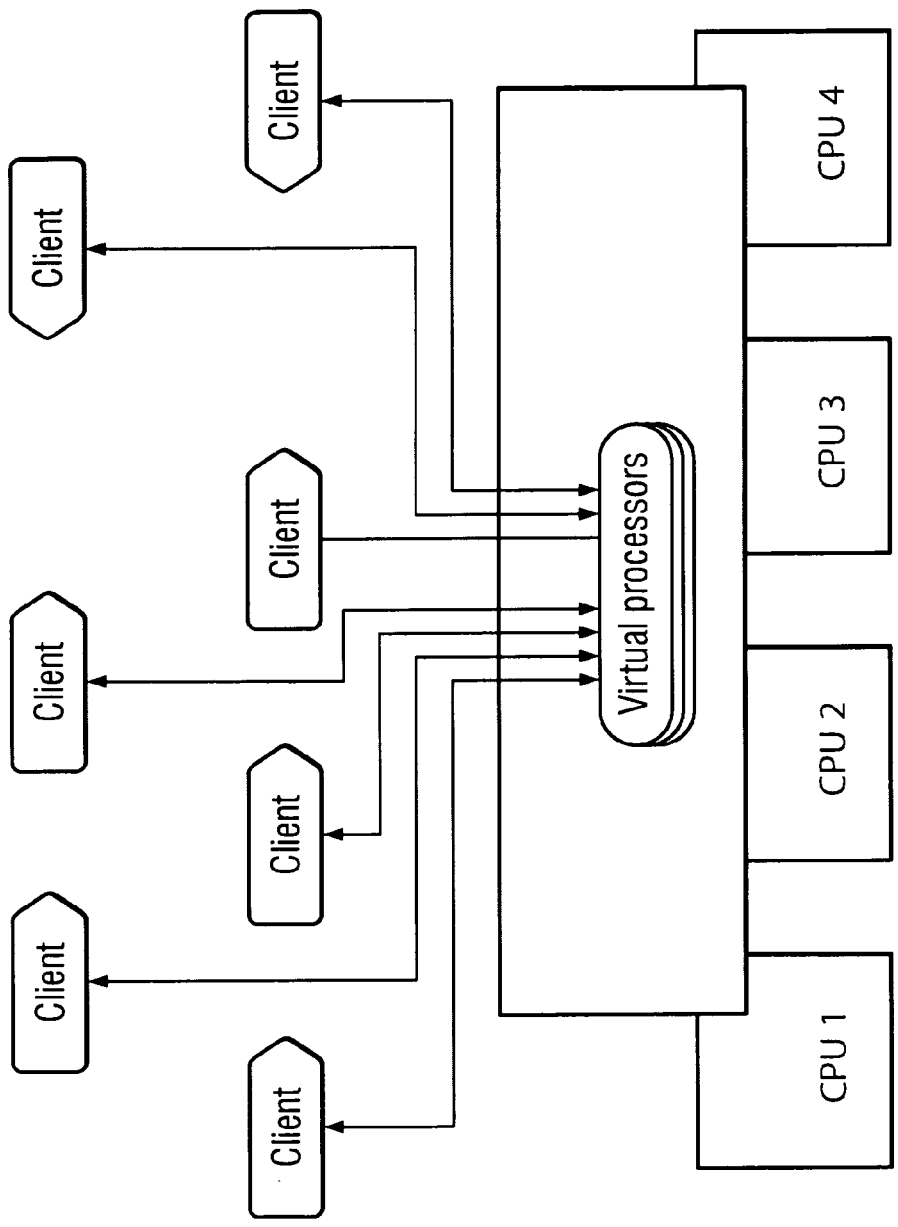
FIG. 1 illustrates schematically the architecture of a system to which the present invention can be applied.

FIG. 1 illustrates schematically the architecture of a system comprising physical CPUs, virtual CPUs, and client (guest) applications, to which the present invention can be applied.

Figure 6B:
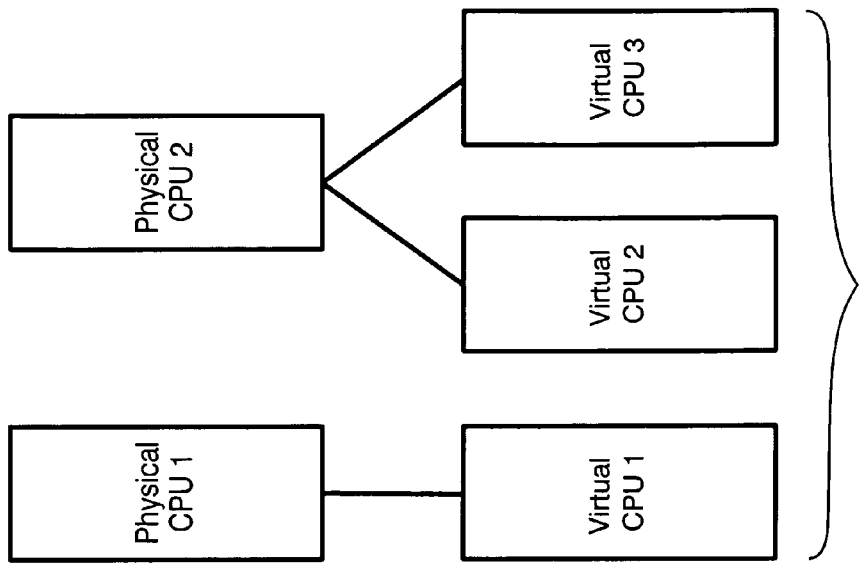
FIGS. 6A and 6B schematically represent load balancing by migrating a virtual CPU from a first physical CPU to a second physical CPU.
Figure 6A:
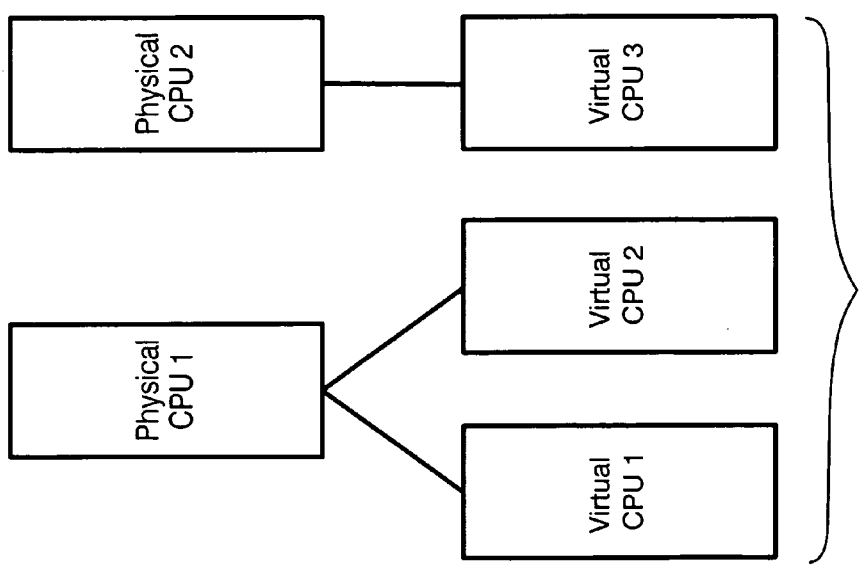

The present invention is based on the realisation that the overall performance of a system as shown in FIG. 1 can be improved by automatically balancing the load on physical CPUs attributed to the same SMP guest. In particular, the idea is to balance the physical CPUs load by migrating a virtual CPU (VCPU) from one physical CPU to another, as shown by FIGS. 6A and 6B. Although this affects a statical VCPU to CPU assignment for a UP guest, the VCPUs to CPUs mapping within a fixed set of CPUs is transparent for SMP guests such that a scheduler which implements the present invention can decide which VCPU is to run on which physical CPU within the fixed CPU set. In other words, if an SMP guest is running on two physical CPUs (a & b), the scheduler creates two VCPUs (x & y) and maps them to the physical CPUs. In this example, two equivalent mappings are possible:

$$VCPU_x \rightarrow CPU_a \text{ and } VCPU_y \rightarrow CPU_b \quad (1)$$

$$VCPU_x \rightarrow CPU_b \text{ and } VCPU_y \rightarrow CPU_a \quad (2)$$

The scheduler is able to dynamically choose one of these mappings depending on CPU loads. The mapping switch results in a "swapping" of VCPUs, i.e. in two VCPUs migrating from one physical CPU to another. Such an operation is fully transparent for the guest and does not change a fixed physical set of CPUs assigned to the guest.

By implementing such a load balancing mechanism, it is possible to at least partially resolve the above described SMP load balancing skewing problem by migrating a server VCPU running on $CPU_0$, for example, to another CPU when the real-time activity is high and this VCPU is loaded. In order to improve the overall performance by such a migration, an underloaded $CPU_n$ (n>0, in this example) must be found and VCPU running on $CPU_n$ must migrate to $CPU_0$.

This solution is partial only in that it does not work when the system is heavily loaded, i.e. when all physical CPUs are fully loaded. However, as such a situation is rare in practice, it is acceptable.

Migration Criteria

Regularly, at a given time period, the scheduler calculates the load of each physical CPU ($LOAD_n$, n=0 ... N) and all VCPUs running on each physical CPU ($VLOAD_{n,m}$, m=0 ... M). See step S1 of FIG. 7. More particularly, two loads are calculated for each VCPU: a "positive" load and a "negative" load.

The positive load for a given $VCPU_{n,m}$ is equal to the actual VCPU load:

$$VPLOAD_{n,m} = VLOAD_{n,m}$$

The negative load for a given $VCPU_{n,m}$ is equal to a sum of the loads of all other VCPUs running on the same physical CPU:

$$VNLOAD_{n,m} = \Sigma VLOAD_{n,i} \; i > 0 \ldots M, \; i \neq m$$

A physical CPU is considered overloaded if its load is above a predetermined threshold (see step S2 in FIG. 7):

$$LOAD_n \geq LOAD_{over}$$

A physical CPU is considered underloaded if its load is below a predetermined threshold (see step S3 in FIG. 7):

$$LOAD_n \leq LOAD_{under}$$

Load balancing is only applied to a pair of CPUs in which one CPU is overloaded and other CPU is underloaded (see step S5 in FIG. 7):

$$CPU_i \leftrightarrow CPU_j$$

where $$CPU_i \geq LOAD_{over} \text{ and } CPU_j \leq LOAD_{under}$$

The load balancing comprises finding two unbalanced VCPUs of the same SMP guest running on $CPU_i$ and $CPU_j$ such that:

$$VPLOAD_{i,k} > VPLOAD_{j,l}$$

and swapping these VCPUs across physical CPUs.

Because a VCPU migration, in terms of processing power, is a quite expensive operation, the migration criteria is adjusted by introducing a positive migration threshold:

$$VPLOAD_{i,k} \geq VPLOAD_{j,l} \geq MIGR\_POS\_WTMARK$$

In addition, the migration criteria takes into account the negative load of the overloaded emigrant;

$$VNLOAD_{i,k} \geq MIGR\_NEG\_WTMARK$$

Figure 7:
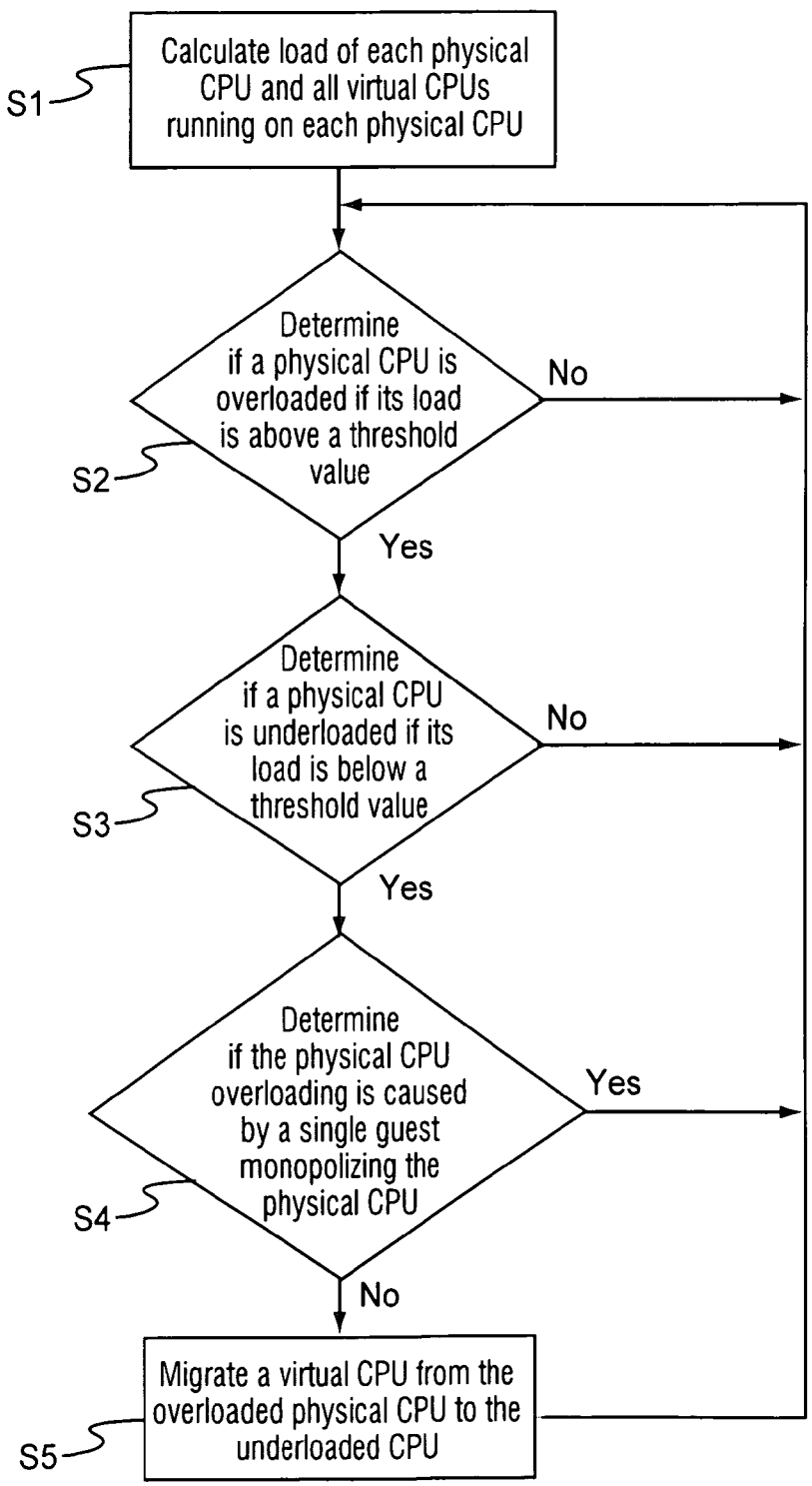
FIG. 7 is a flow chart showing the migration of a virtual CPU from an overloaded physical CPU to an underloaded physical CPU.

The negative load water mark avoids unnecessary migrations when the CPU overloading is not caused by a simultaneous activity of multiple guests, but rather by a single guest monopolizing the physical CPU (see step S4 in FIG. 7).

Specific Implementation

A mymips program has been used to demonstrate skewing in the SMP load balancing of a guest operating system. The mymips program permanently calculates the program execution speed (MIPS) and prints out the calculation results on console.

mymips provides the following result when running on a SMP Linux guest with a dedicated single physical CPU:
min/max/ave: 258/258/258

The results above and below were obtained on a DELL D820 Dual Core 1.8 MHz Laptop.

Two mymips programs provide the following result when running on an SMP Linux with two dedicated CPUs:
min/max/ave: 257/259/258
min/max/ave: 258/259/258

A basic configuration which can be used to implement the load balancing mechanism in accordance with an embodiment of the invention comprises two SMP Linux guests sharing two physical CPUs. In order to obtain an unbalanced load on such a configuration, guests have been running on a conventional system without load balancing mechanism. Two mymips programs running simultaneously on each guest provide the following results:
min/max/ave: 101/258/190
min/max/ave: 92/257/190

This shows about 25% of performance hit comparing to a single SMP Linux which performs a load balancing (at OS level) across multiple CPU s. The performance hit is due to sporadic mymips migrations from one CPU to another. Such a migration randomly runs mymips on the same processor.

This practical result is fully in line with a theoretical determination. Because of a random nature of migrations, the probability of running both mymips on the same CPU is 0.5. Thus, an expected performance hit is 0.25 because when running two programs on the same CPU, only a half of the CPU power is available.

Figure 2:
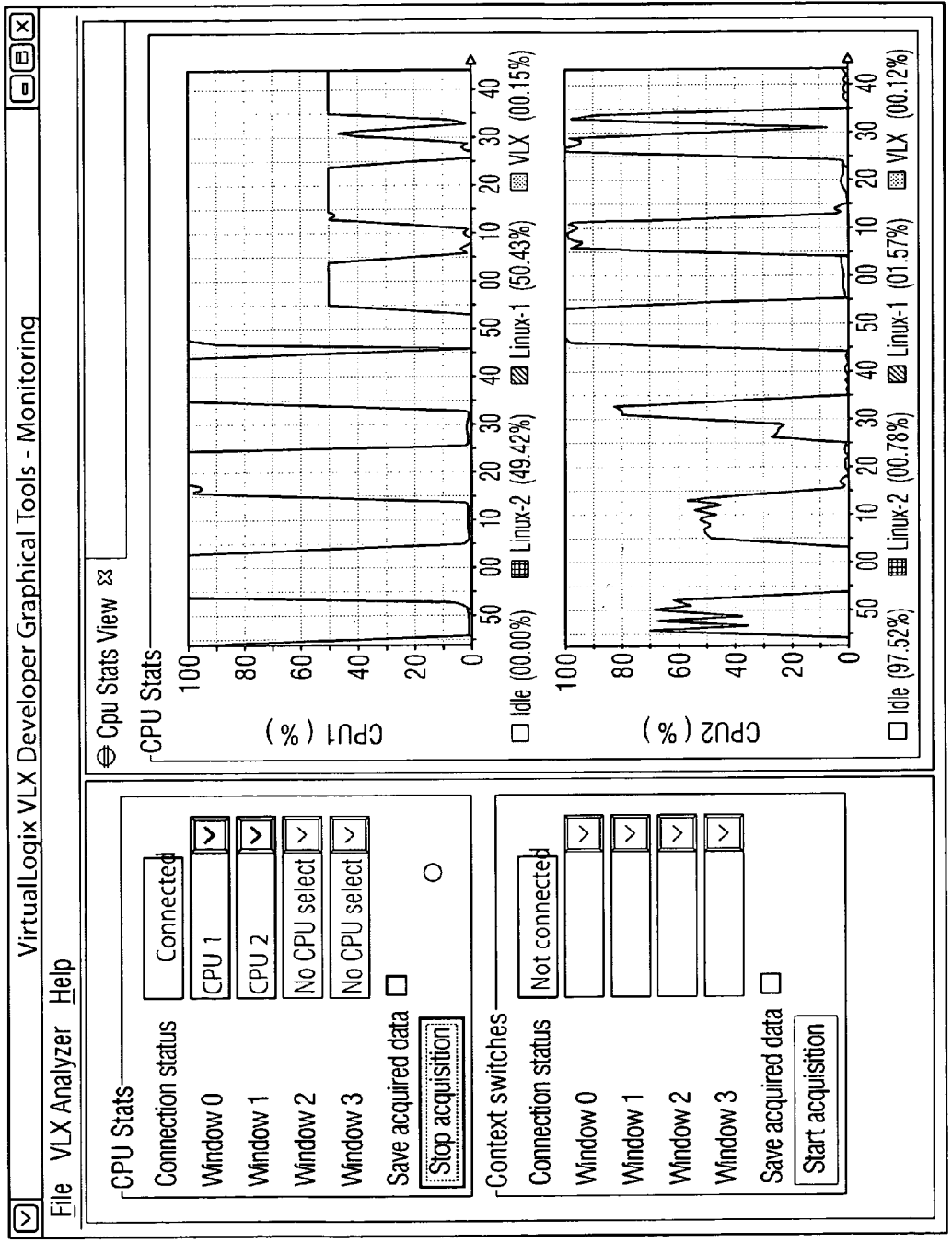
FIGS. 2 to 5 illustrate screen shots showing CPU usage statistics with and without load balancing in accordance with an embodiment of the invention.

FIG. 2 illustrates a screen shot showing CPU usage statistics without load balancing in accordance with an embodiment of the invention. The screen shot represents the scenario described above.

When running the same load with load balancing enabled, the performance is close to a single SMP Linux.
min/max/ave: 254/257/256
min/max/ave: 250/256/255

The load balancing compensates sporadic migrations of mymips (from one VCPU to another) caused by the Linux SMP scheduler. In other words, the scheduler tries to execute heavy loaded VCPUs on different physical CPUs.

Figure 3:
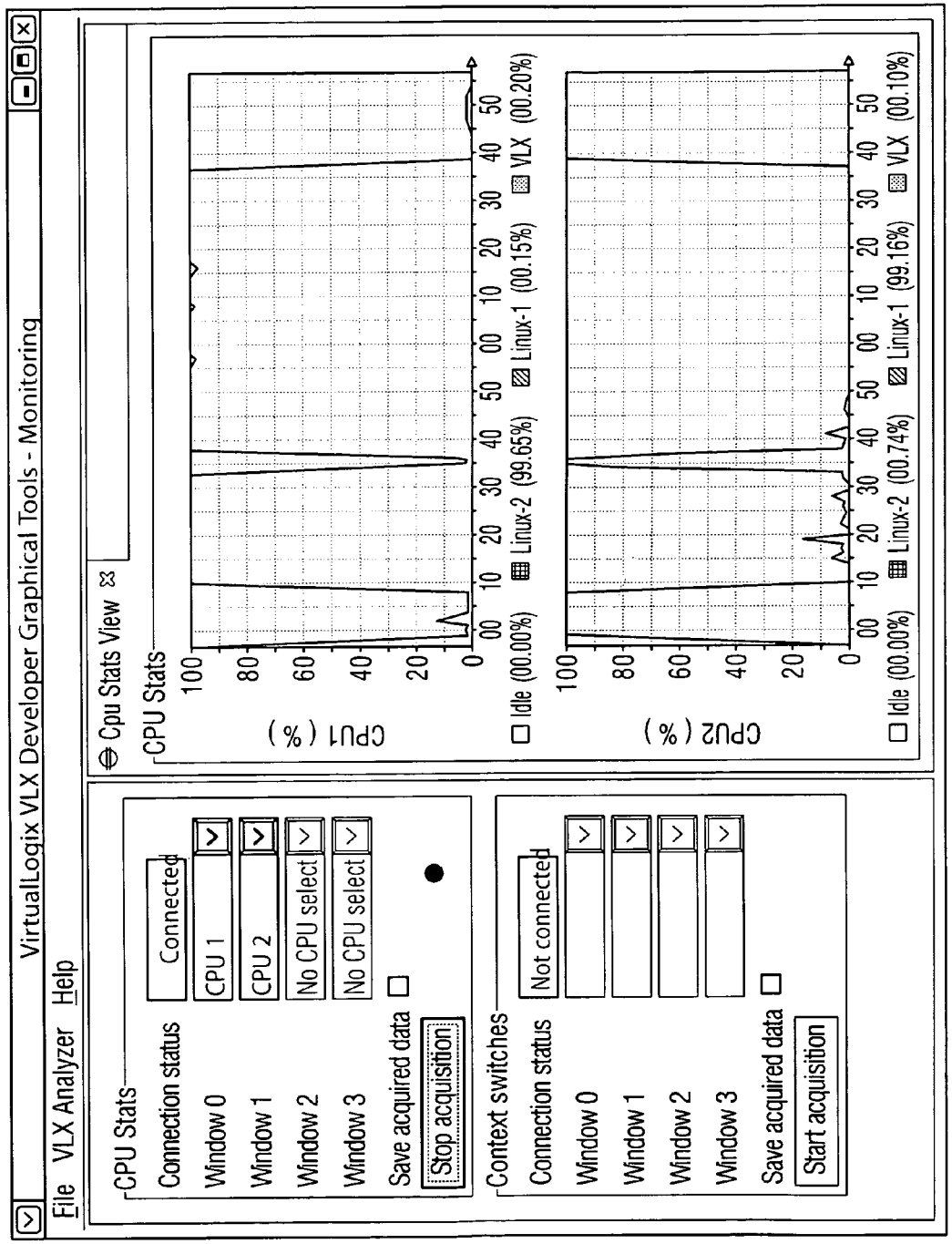

FIG. 3 illustrates a screen shot showing CPU usage statistics with load balancing in accordance with an embodiment of the invention. The screen shot represents the scenario described above.

In order to confirm the above theoretical conclusion, a Linux kernel compilation was used as a variable load. Two compilations were running in parallel on two Linux guests in the following three configurations:

(1) Two Linux guests each running on a dedicated CPU
(2) Two Linux guests sharing two CPUs without load balancing
(3) Two Linux guests sharing two CPUs with load balancing Each time, the duration of compilation was measured. Results corresponding to different Linux kernel compilations are shown below.

(1.1) 11m21.046s
(1.2) 5m34.204s
(2.1) 16m4.272s
(2.2) 12m20.575s
(3.1) 13m51.974s
(3.2) 10m32.467s

The performance hit on the system without load balancing (2) is about 40%, while the performance hit on the system with load balancing (3) is about 20%. Accordingly, the load balancing improves a performance degradation caused by a transparent CPU sharing among multiple SMP guests.

Figure 4:
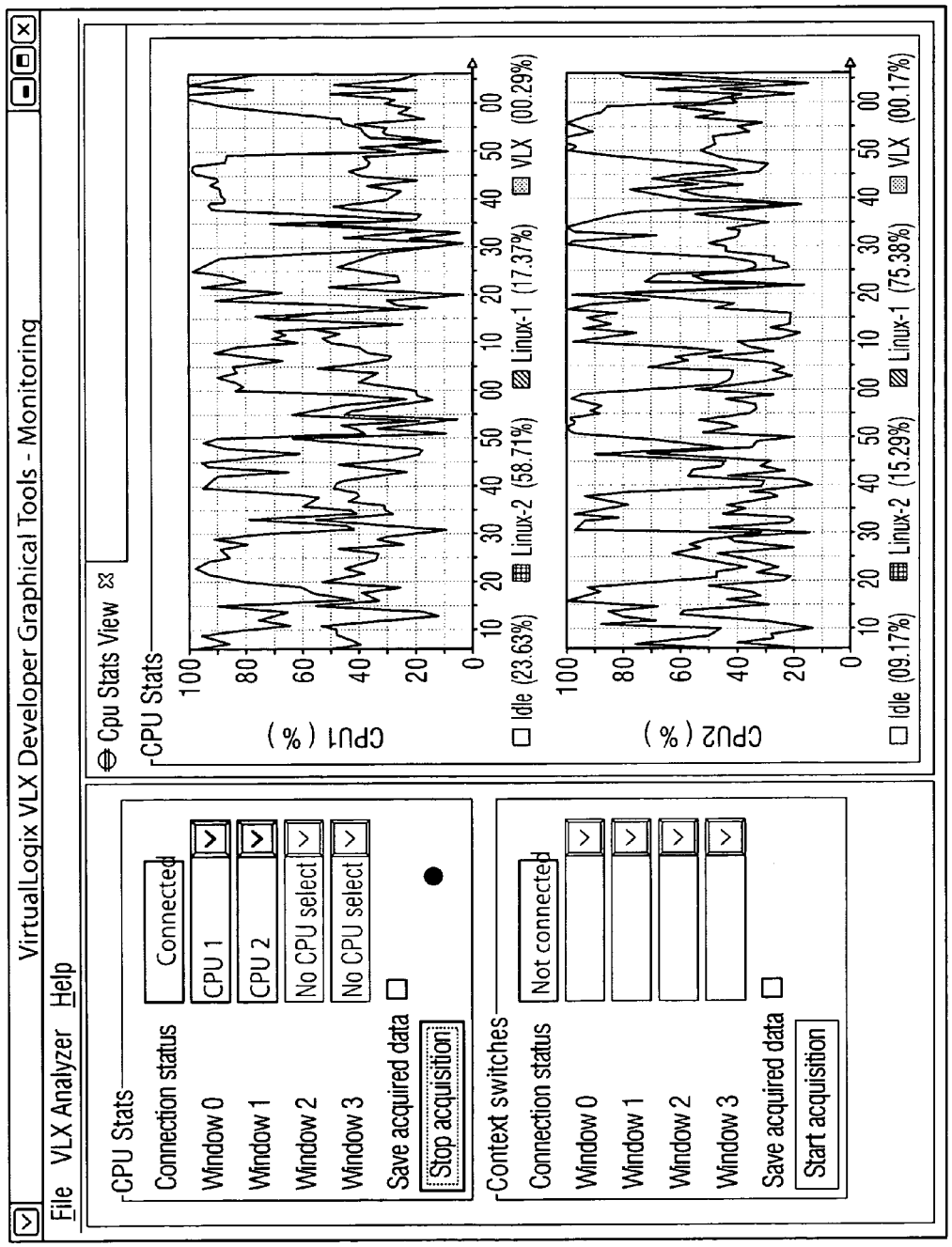
Figure 5:
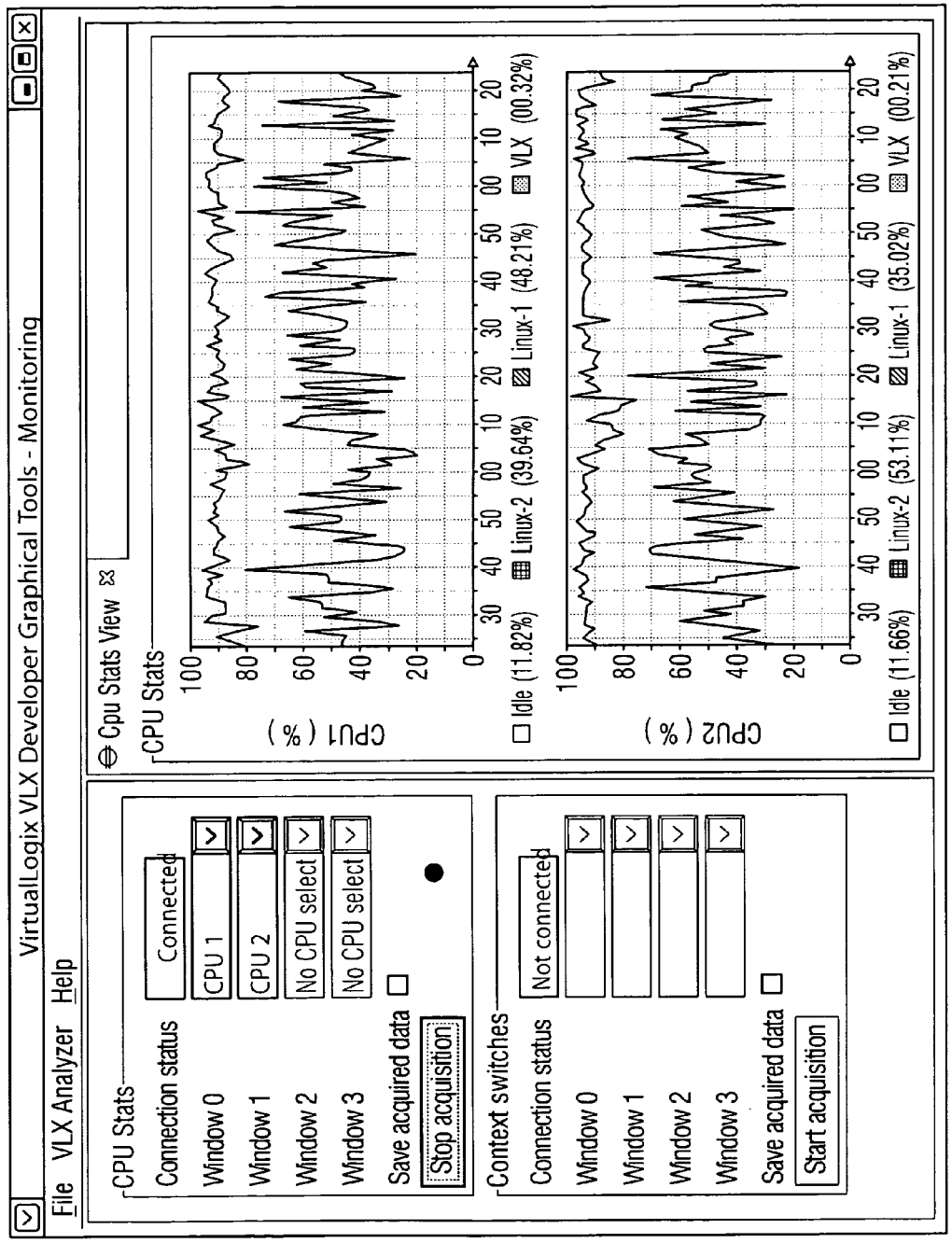

FIGS. 4 and 5 illustrate screen shots showing CPU usage statistics with and without load balancing in accordance with an embodiment of the invention. The screen shots represent the scenarios described above.

The above results were obtained using the following load balancing parameters:
PERIOD=10 milliseconds
$LOAD_{under}$=80%
$LOAD_{over}$=100%
MIGR_POS_WTMARK=5%
MIGR_NEG_WTMARK=5%

It may be possible to achieve even better result on a variable load by modifying these parameters.

Other Aspects and Embodiments

It will be clear from the forgoing that the above-described embodiments are only examples, and that other embodiments are possible and included within the scope of the invention as determined from the claims.

The invention claimed is:

1. A method of load balancing in a data processing system comprising a plurality of physical CPUs and a plurality of virtual CPUs, the method comprising:
   mapping one or more virtual CPUs to each of said physical CPUs;
   determining, for a given virtual CPU, a negative load value indicative of the sum of the loads of all other virtual CPUs that are allocated to the same physical CPU as the given virtual CPU; and
   adapting the mapping of the given virtual CPU depending on the load of said physical CPUs and said negative load value.

2. The method of claim 1, comprising:
   swapping the mapping only if the difference of loads of said first and second virtual CPUs is above a predetermined threshold.

3. The method of claim 1, wherein the mapping of a first virtual CPU to a first physical CPU and the mapping of a second virtual CPU to a second physical CPU are swapped if the load of the first physical CPU is larger than the load of the second physical CPU, the load of the first virtual CPU is larger than the load of the second virtual CPU, and the negative load value of the first virtual CPU is above a predetermined threshold.

4. The method of claim 3, comprising:
running a multiprocessor operation involving said first and second physical CPUs; and
assigning said first and second virtual CPUs to said multiprocessor operation, for executing said multiprocessor operation.

5. The method of claim 3, comprising:
swapping the mapping of the first and second virtual CPUs to the first and second physical CPUs, respectively, in response to a change of load of at least one of the first and second physical CPUs.

6. The method of claim 3, comprising:
determining the load of said first and second virtual CPUs;
determining whether the load of said first and second physical CPUs is above a first threshold and below a second threshold, respectively; and
swapping the mapping of the first virtual CPU to the first physical CPU and the mapping of the second virtual CPU to the second physical CPU if
the load of the first physical CPU is above said first threshold, and
the load of the second physical CPU is below said second threshold.

7. The method of claim 3, comprising:
running an operation of a high scheduling priority on one of said first and second physical CPUs, wherein said multiprocessor operation has a relatively lower scheduling priority.

8. The method of claim 7, wherein the operation of a higher scheduling priority is executed by a dedicated real-time software.

9. The method of claim 7, wherein said multiprocessor operation is executed by a generic server software.

10. A computer system, arranged to perform the method of claim 1.

11. A computer program product stored in a non-transistory computer readable medium, which when executed by a data processing device, executes the method of claim 1.

* * * * *